US012791375B2

(12) United States Patent
Quach

(10) Patent No.: US 12,791,375 B2
(45) Date of Patent: Nov. 10, 2026

(54) WASTEWATER SENSOR CAP ATTACHED TO STANDARD SEWER CLEANOUT PORT ASSEMBLED IN HOUSE SEWER LINE

(71) Applicant: Trung Quach, Bonney Lake, WA (US)

(72) Inventor: Trung Quach, Bonney Lake, WA (US)

( * ) Notice: Subject to any disclaimer, the term of this patent is extended or adjusted under 35 U.S.C. 154(b) by 346 days.

(21) Appl. No.: 18/733,660

(22) Filed: Jun. 4, 2024

(65) Prior Publication Data

US 2025/0369790 A1 Dec. 4, 2025

(51) Int. Cl.
*G01F 23/24* (2006.01)
*E03F 5/02* (2006.01)

(52) U.S. Cl.
CPC .............. *G01F 23/242* (2013.01); *E03F 5/02* (2013.01)

(58) Field of Classification Search
None
See application file for complete search history.

(56) References Cited

U.S. PATENT DOCUMENTS 4,392,128 A * 7/1983 Young ........................ E03F 7/00 137/557
8,066,029 B2 * 11/2011 McDonald .............. E03B 7/071 137/593
8,677,923 B2 * 3/2014 Goff ........................ G01F 23/58 116/228
9,416,526 B2 * 8/2016 Goff ...................... G01F 23/603
10,032,357 B2 * 7/2018 Dunn ...................... E03F 5/042
11,619,322 B1 * 4/2023 Russell ..................... F16L 1/11 138/89
2023/0366192 A1 * 11/2023 Padmanabhan ........... E03F 7/00

* cited by examiner

*Primary Examiner* — Peter J Macchiarolo
*Assistant Examiner* — Jermaine L Jenkins
(74) *Attorney, Agent, or Firm* — Dean A Craine; Marisa C Whitaker

(57) ABSTRACT

A wastewater sensor cap that selectively attaches to a standard sewer cleanout port assembled in a house's sewer line. The sensor cap includes a cap body with external threads that connect to internal threads formed inside the cleanout port. Formed or attached to the cap body is a nut body, which enables the cap body to be securely tightened to the cleanout port with a wrench. Attached to the cap body are two electrodes that extend through the cap body and into the void space formed in the cap that communicates with a fill area in the cleanout port. Attached to each electrode are wires from an electronic signal device that creates an alarm signal when a ground fault occurs caused by sewer contacting the tips of the electrodes extending into the void space. The signal device may include a wireless communication transmitter that sends a wireless signal to a remote wireless communication receiver configured to receive the wireless signal from the signal device.

22 Claims, 7 Drawing Sheets

WASTEWATER SENSOR CAP ATTACHED TO STANDARD SEWER CLEANOUT PORT ASSEMBLED IN HOUSE SEWER LINE

FIELD AND BACKGROUND OF THE INVENTION

Field of the Invention

This invention pertains to house sewer drain caps, particularly to sewer drain caps that inform the house occupier that the house's inside sewer line is backing up with sewer.

Background of the Invention

A sewer cleanout is a capped pipe that provides direct access to a house's interior sewer line (called a house waste line) or to an external sewer line. The cleanout port connects the house's waste line to an exterior sewer line that extends to a septic tank or a community sewer line. The cleanout port is an access point used by homeowners and plumbing professionals to clear clogs in the waste line and sewer line that can cause sewer backups. The cleanout ports in older houses are often located inside the house. In newer houses, the cleanout ports are usually outside the house.

When a clog is first formed, a homeowner will notice the house fixtures slowly drain. Eventually, the sewer will back up and prevent sinks and toilets from draining completely. A clog, however, can occur anywhere in the waste line or sewer line, either upstream or downstream from the cleanout port. By removing the cap on the cleanout port, homeowners or plumbers can usually determine if the clog is upstream or downstream from the cleanout port. If the clog is in the sewer line and downstream from the cleanout port, the sewer will fill the cleanout port. If the clog is in the waste line and upstream from the cleanout port, little or no sewer fills the cleanout port. By removing the cap and seeing if the sewer is present in the cleanout port, an assumption can be made regarding where the clog is located. Unfortunately, removing the cap from the cleanout port is risky and can lead to sewer spillage inside or outside the house.

What is needed is a sewer cap that attaches to a sewer cleanout port that provides a signal when the cleanout port is filled with sewer.

What is also needed is an easy, clean way to drain sewer from the cleanout port.

SUMMARY OF THE INVENTION

These and other objects are met by a wastewater sensor cap that selectively attaches to a standard sewer cleanout port assembled in a house's sewer line. A sewer cleanout port is a capped three-legged pipe that provides direct access to a house's interior sewer line and to an external sewer line. The sensor cap includes a cylindrical, cap body with external threads that connect to internal threads commonly formed inside the cleanout port. An upward extending neck is formed or attached to the cap body top surface. Integrally formed on the neck is a nut-shaped body, which enables the cap body to securely tighten to the cleanout port by hand or with a wrench.

Attached to each electrode is an electronic signaling device that creates an alarm signal when a ground fault condition occurs caused by sewer contacting the tips of the electrodes extending into the cleanout port. The signaling device may include a battery that provides electrical current, an optional speaker that creates an audible sound, and a wireless communication transmitter that sends a wireless signal to the homeowner's wireless device with a wireless communication receiver configured to receive a alarm signal produced by the signaling device. The wireless device may include a signal-receiving software application loaded into its memory that informs the homeowner when an alarm signal has been received.

In one embodiment, the cap body includes a threaded neck with a bore that communicates with the void space inside the cap body. Attached to the threaded neck is a removable secondary cap that enables the sewer to flow out of the sensor cap. In another embodiment, the neck may include a valve, such as a ball or gate valve, that enables the user to selectively control sewer flow through the neck.

DETAILED DESCRIPTION OF THE INVENTION

Figure 1:
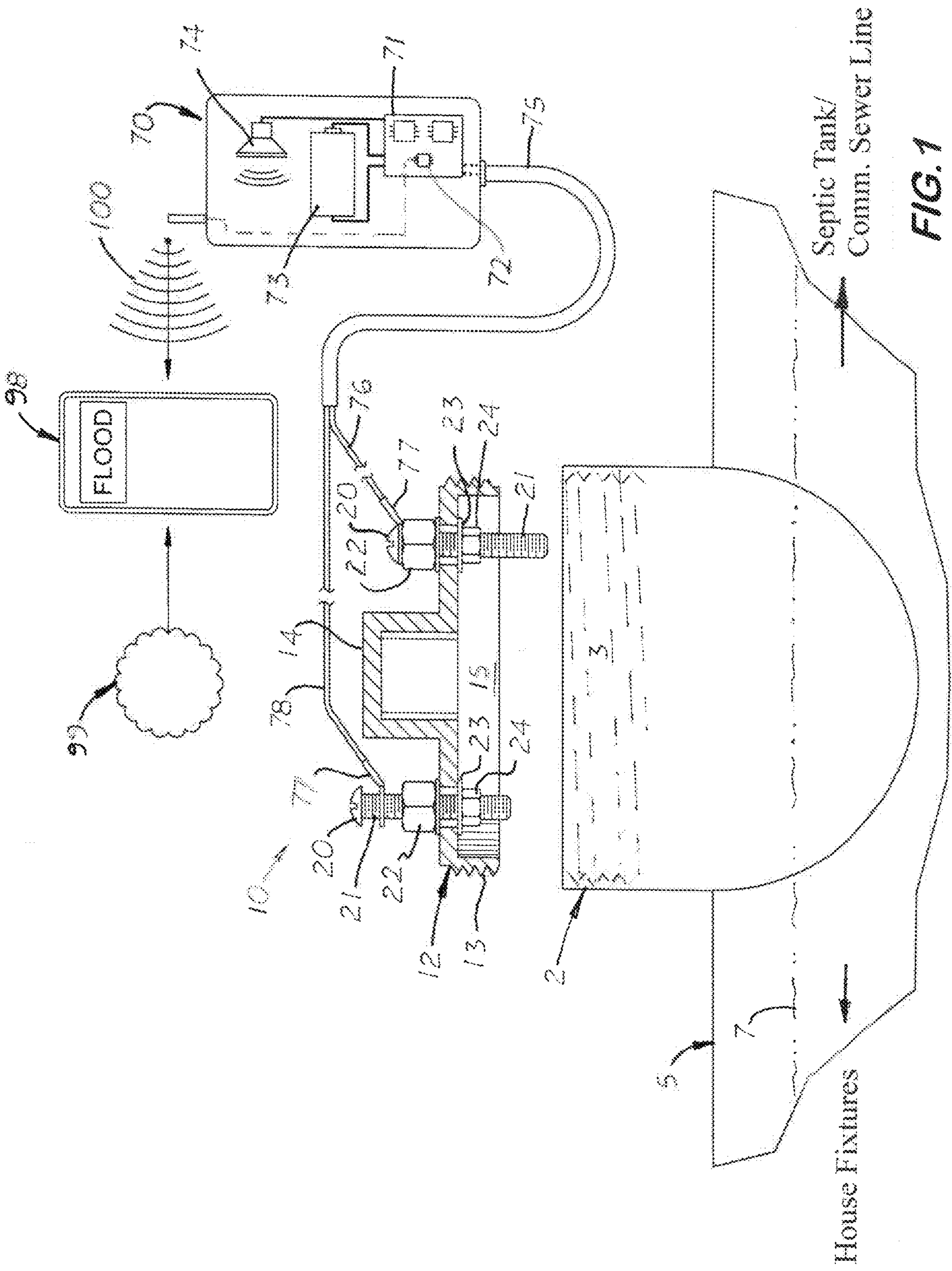
FIG. 1 illustrates the sensor cap with electrodes attached via wires to an electronic signal device that generates a wireless alarm signal for the user's wireless device.
Figure 2:
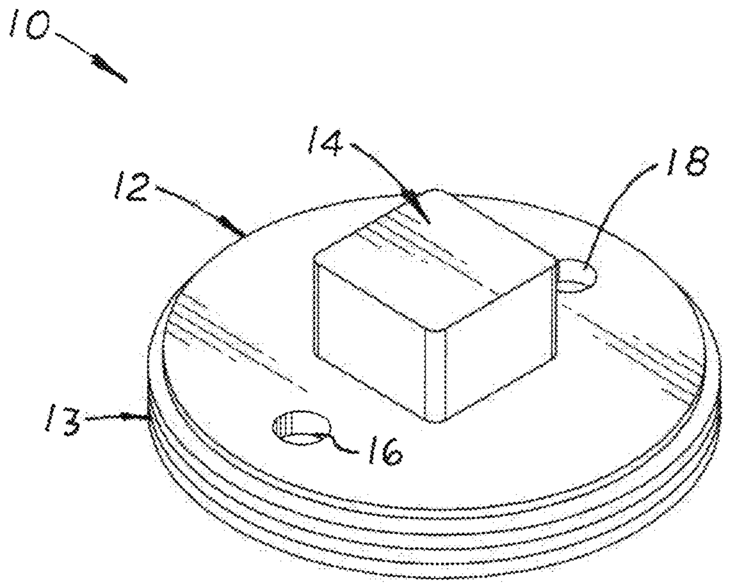
FIG. 2 is a perspective view of the sensor cap with a cap body with external threads, a nut body formed on the top surface of the cap body, and two electrode bores.
Figure 3:
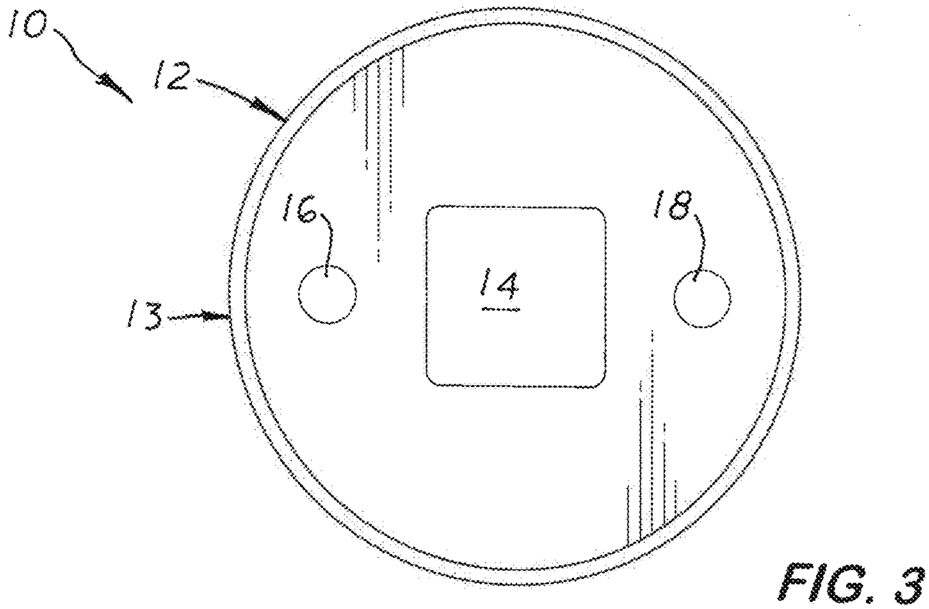
FIG. 3 is a top plan view of the sensor cap shown in FIG. 2.
Figure 4:
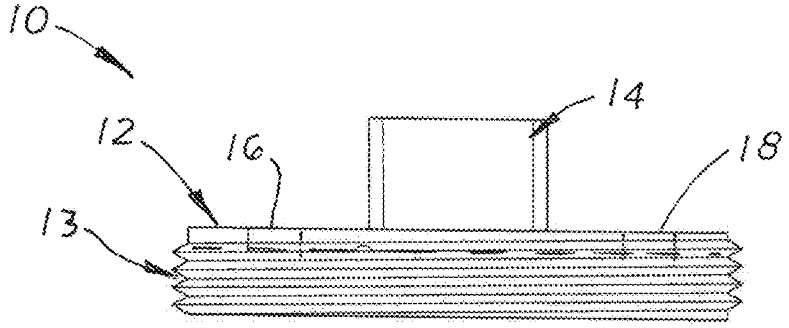
FIG. 4 is a side elevational view of the sensor cap shown in FIGS. 2 and 3.
Figure 5:
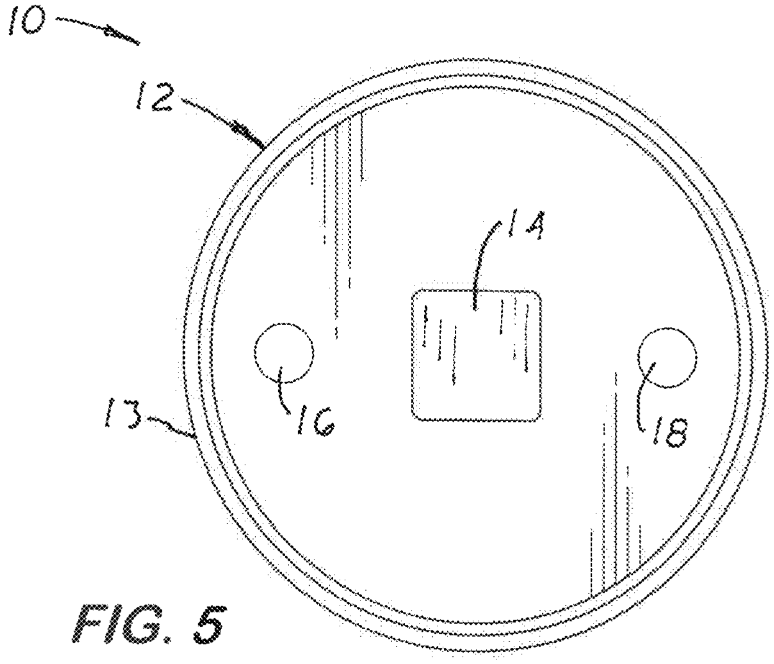
FIG. 5 is a bottom plan view of the sensor cap shown in FIGS. 2-4.
Figure 6:
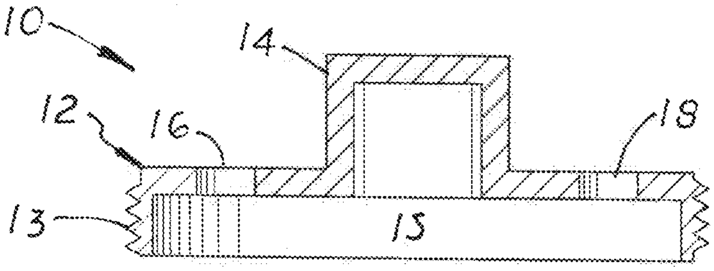
FIG. 6 is a sectional side elevational view of the sensor cap shown in FIGS. 2-5.
Figure 7:
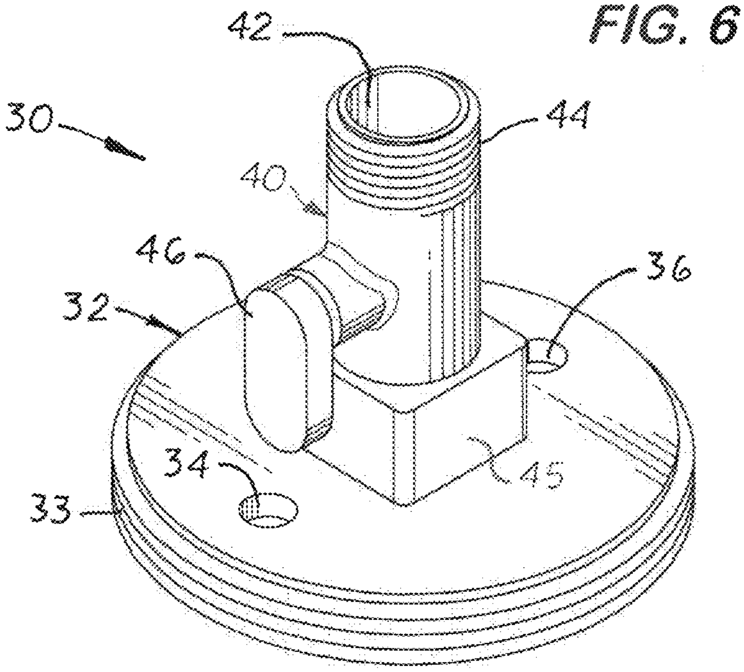
FIG. 7 is a perspective view of another embodiment of the sensor cap with cap body with external threads, a nut body formed on the top surface of the cap body, a threaded neck extending upward from the nut body and a ball valve formed inside the threaded neck.
Figure 8:
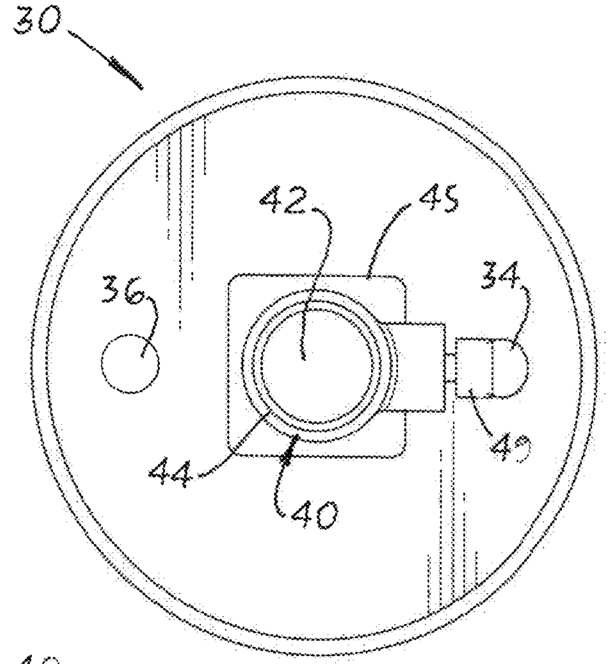
FIG. 8 is a top plan view of the sensor cap shown in FIG. 7.

Several embodiments of a sensor cap 10, 30, 50, and 80 each configured to selectively attach to the cleanout port 2 on a house waste line 5 that connects at one end to the house's plumbing fixtures and at an opposite end to a septic tank/community sewer line. Each sensor cap 10, 30, 50, and 80 is configured to connect to a signal device 70 that produces an alarm signal 100 when the void space 15, 38, 58 and 83 inside each sensor cap 10, 30, 50 and 80, respectively, is filled with gray and black water, (called sewer 7. Sewer 7 fills the void spaces 15, 38, 58, and 82 when a clog is formed downstream from the cleanout port 2. Each sensor cap 10, 30, 50, 80 includes two electrodes 20 that extend into the void spaces 15, 38, 58, and 82 and, contact the sewer 7 creating a ground fault that triggers the signal device 70 to produce the alarm signal 100.

In the embodiment shown in FIGS. 1-6, the sensor cap 10 includes a cylindrical cap body 12 with pendent sidewalls with external threads 13. Threads 13 are configured to connect to internal threads 3 formed inside the cleanout port 2. Formed or attached to the cap body 12 is a nut body 14 closed on a top end. The nut body 14 enables the cap body 12 to securely tighten to the cleanout port 2 by hand or with a wrench.

Formed or attached to the top surface of the cap body 12 are two electrode bores 16, 18. The bores 16, 18 extend through the cap body 12 and communicate with the recessed void space 15 inside the cap body 12.

Inserted into each bore 16, 18 is a ground fault-detecting electrode 20. Various types of ground fault-detecting electrodes may be used. FIG. 1 shows one type comprising a threaded metal bolt or post that extends into each bore 16, 18. Each electrode 20 includes a head and a threaded narrow shaft 21. Mounted on the upper section of the threaded bolt 21 is an optional, metal spacer nut 22. Mounted on the lower section of the shaft 21 is a lower washer 23 and a second nut 24. During assembly, the spacer nut 22 is positioned over the top surface of the cap body 12 and allows the head of the threaded bolt 20 to press tightly against an electrical connector 77 discussed further below.

The signal device 70 produces an alarm signal 100 when a ground fault occurs between the two electrodes 20. The signal device 70 includes a water-tight body with a printed circuit board 71, a communication wireless signal transmitter 72, a battery 73, and an optional speaker 74 inside. When a ground fault is detected by the electrodes 20, the printed circuit board 71 is activated, causing the communication wireless signal transmitter 72 to transmit a wireless signal 100 to a receiving signal device 97. In FIG. 1, the receiving signal device 98 is shown as a mobile phone or tablet computer with a software application 99 installed into a working member of the device 98 that informs the user that an alarm signal 100 has been received from the signal device 70.

The communication wireless signal transmitter 72 may be a wireless communication transmitter that produces a Wi-Fi signal in a frequency bandwidth of either 2.4 GHz or 5 GHz. Alternatively, the wireless communication transmitter may be a Bluetooth radio frequency transmitter. The receiving signal device 98 must have a built-in communication signal receiver capable of receiving the wireless signal 100.

The printed circuit board 71 is connected to battery 73, speaker 74, and cable 75. Cable 75 includes two wires 76 and 78. Attached to the ends of the wires 76,78 are electrical connectors 77 each configured to attach to the electrodes 20. During assembly, one connector 77 is attached to one electrode 20.

FIGS. 7-11 show a second embodiment of the sensor cap 30 that includes a cylindrical cap body 32 with external threads 33 formed on its sidewall that connects to internal threads 3 formed inside the cleanout port 2. Formed inside the cap body 32 is a void space 38. Extending upward from the cap body 32 is a neck 40 with optional external threads 44. Formed on the lower section of the neck is a nut-shaped body 45. Extending through the nut body 45 and neck 40 is a center bore 42 that communicates with the void space 38. Like the sensor 10, formed or attached to the top surface of the cap body 32 are two electrode bores 34, 36. Bores 34 and 36 extend through the cap body 32 and communicate with the void space 38. During assembly, two electrodes 20 are inserted into each bore 34, 36.

Figure 9:
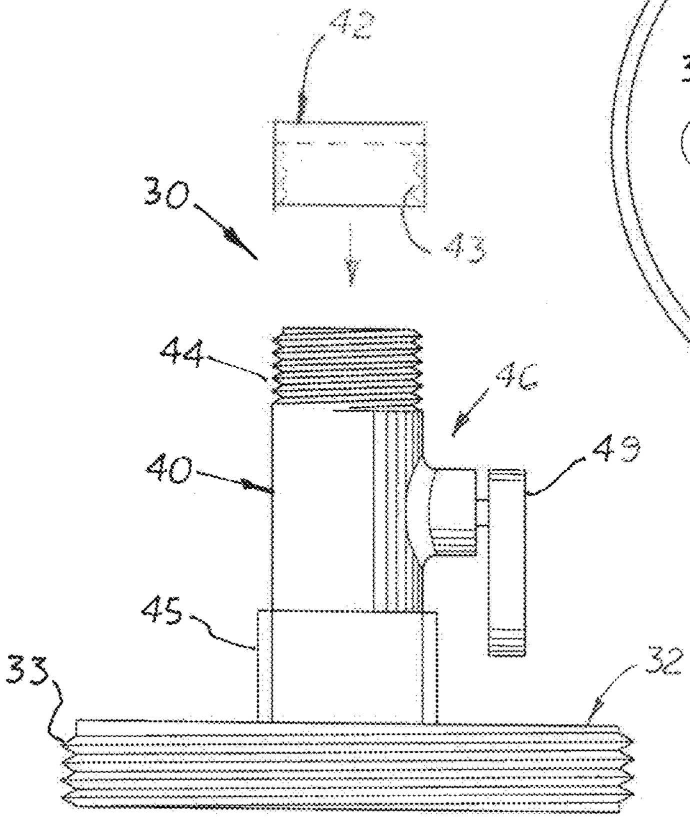
FIG. 9 is a side elevational view of the sensor cap shown in FIGS. 7 and 8.
Figure 10:
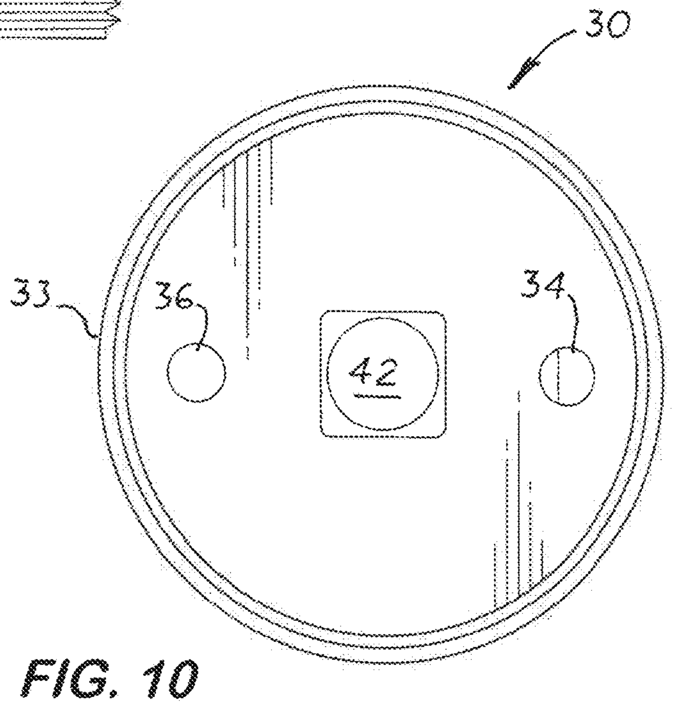
FIG. 10 is a top plan view of the sensor cap shown in FIGS. 7-9.

Inside the neck 40 is a manual valve 46. In the embodiment shown, the manual valve 46 is a ball valve that includes a ball 47 mounted in a spherical recessed void area 48 formed inside the neck 40. The ball 47, which includes a transversely aligned center hole, is positioned inside the void area 48 void and configured to rotate. Attached to the ball 47 is a handle 49 that extends through the neck 40 which enables a user to selectively rotate the ball 47 to align or misalign the ball's center hole with the neck's center bore 41. The center hole is approximately the same diameter as the neck's center bore 42. By rotating the ball, the valve can be opened or closed. During use, the valve 46 allows the user to release sewer in the void space 38 through the neck 40. As shown in FIG. 9, an optional cap 42 with internal threads 43 may be provided that attaches to the neck threads 44.

Figure 11:
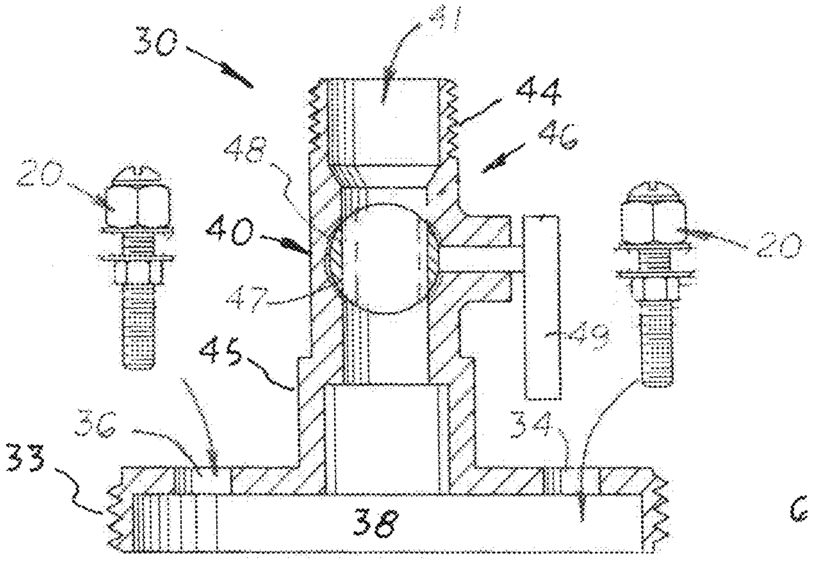
FIG. 11 is a sectional side elevational view of the sensor cap shown in FIGS. 7-10.
Figure 12:
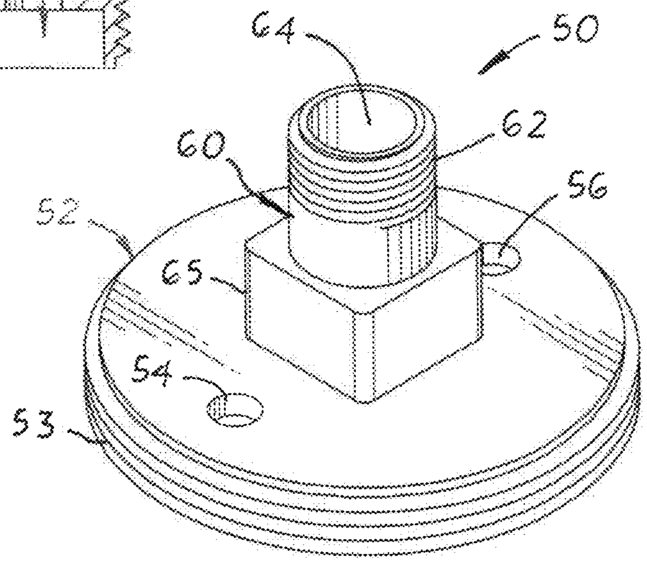
FIG. 12 is a perspective view of a third embodiment of the sensor cap with cap body with external threads, a nut body formed on the top surface of the cap body, a threaded neck extending upward from the nut body and two electrode bores.
Figure 13:
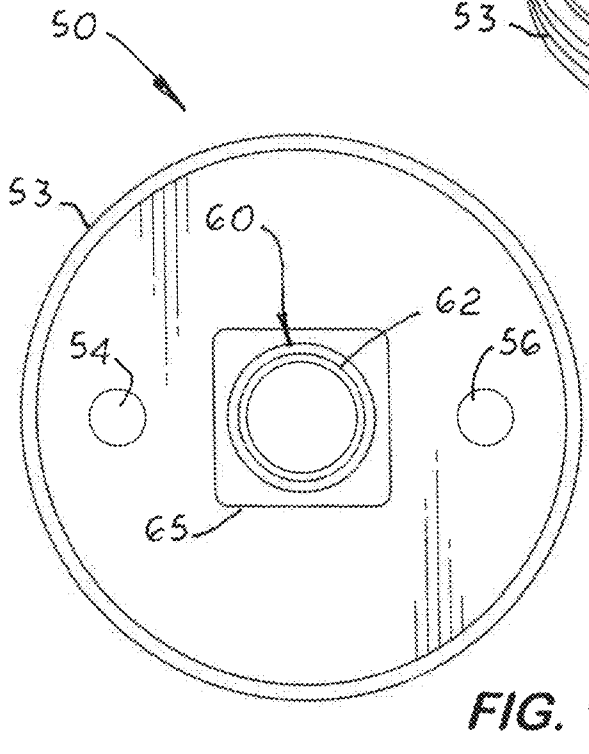
FIG. 13 is a top plan view of the sensor cap shown in FIG. 12.
Figure 14:
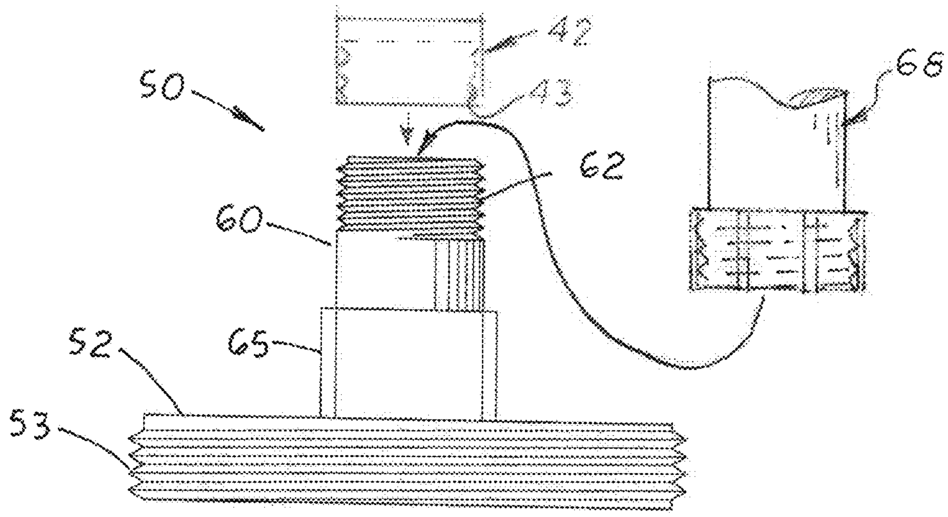
FIG. 14 is a side elevational view of the sensor cap shown in FIGS. 12 and 13 with an optional second cap or a hose attached to the threaded neck.
Figure 15:
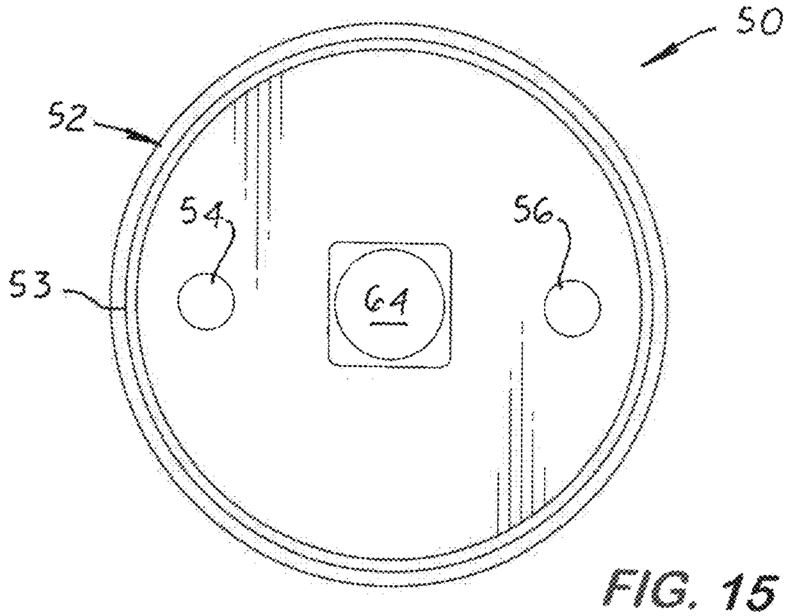
FIG. 15 is a top plan view of the sensor cap shown in FIGS. 12 and 13.
Figure 16:
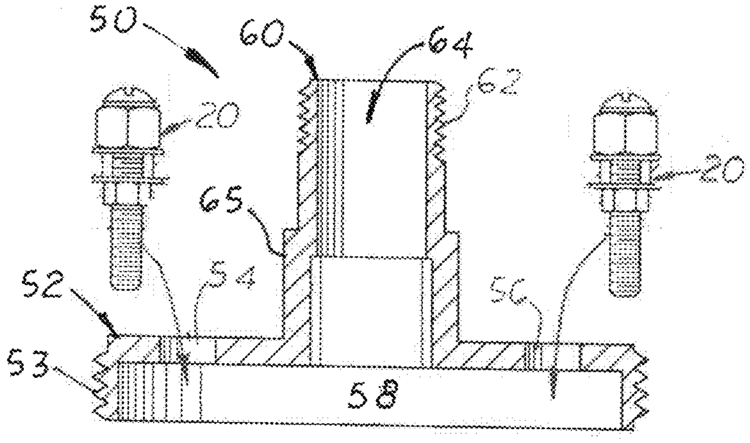
FIG. 16 is a sectional side elevational view of the sensor cap shown in FIGS. 12-15.

FIGS. 12-16 show a third embodiment of the sensor cap 50 that includes a cap body 52 similar to the cap body 32 shown in FIGS. 7-11 but without a manual valve 46. The cap body 52 is cylindrical with external threads 53 formed on its sidewall that connects to internal threads 3 formed inside the cleanout port 2. Extending upward from the cap body 52 is a neck 60 with optional external threads formed on its distal end. Formed on the lower section of the neck 60 is a nut body 65. Extending through the neck 60 and the nut body 65 is a center bore 64 that communicates with the void space 58 located under the cap body 52 Formed or attached to the top surface of the cap body 52 are two electrode bores 54, 56 that extend through the cap body 52 and communicate with the recessed center space 58. Two electrodes, similar to the electrodes shown in FIGS. 1 and 11, are inserted into the electrode bores 54 and 56. Like the embodiment shown in FIG. 19, an optional cap 42 with internal threads 43 may be provided that attaches to the neck threads 62.

Figure 17:
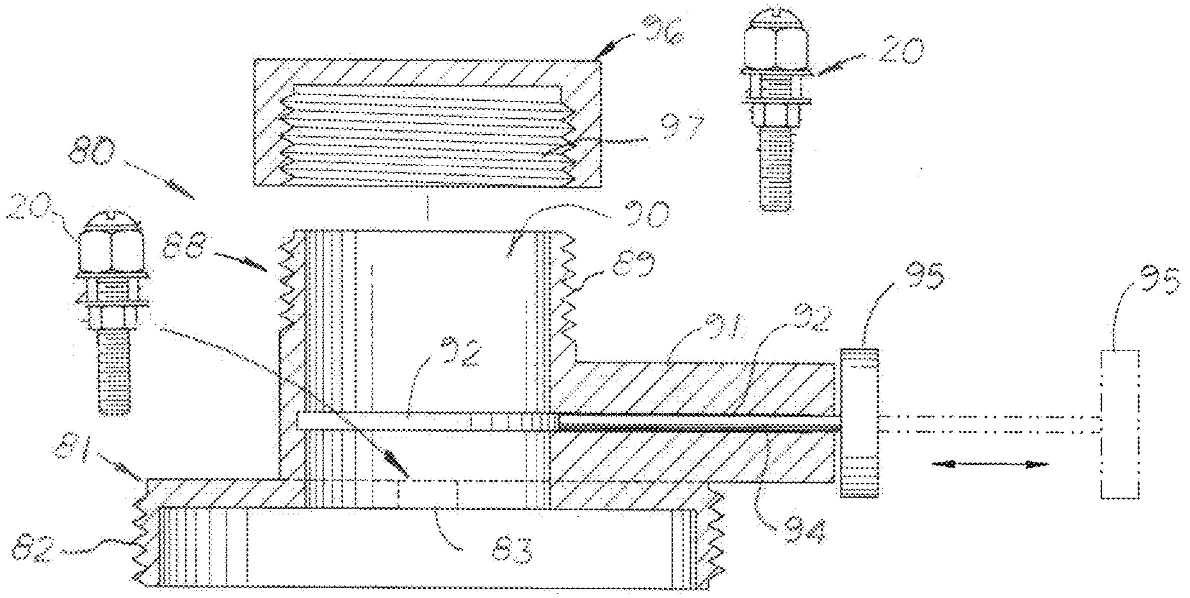
FIG. 17 is a sectional side elevational view of a fourth embodiment of the sensor cap with a cap body with external threads, a combination nut body, a slide gate valve formed in the nut body, a threaded neck extending upward from the nut body, two electrode bores formed on the cap body, and a second cap attached to the threaded neck.
Figure 18:
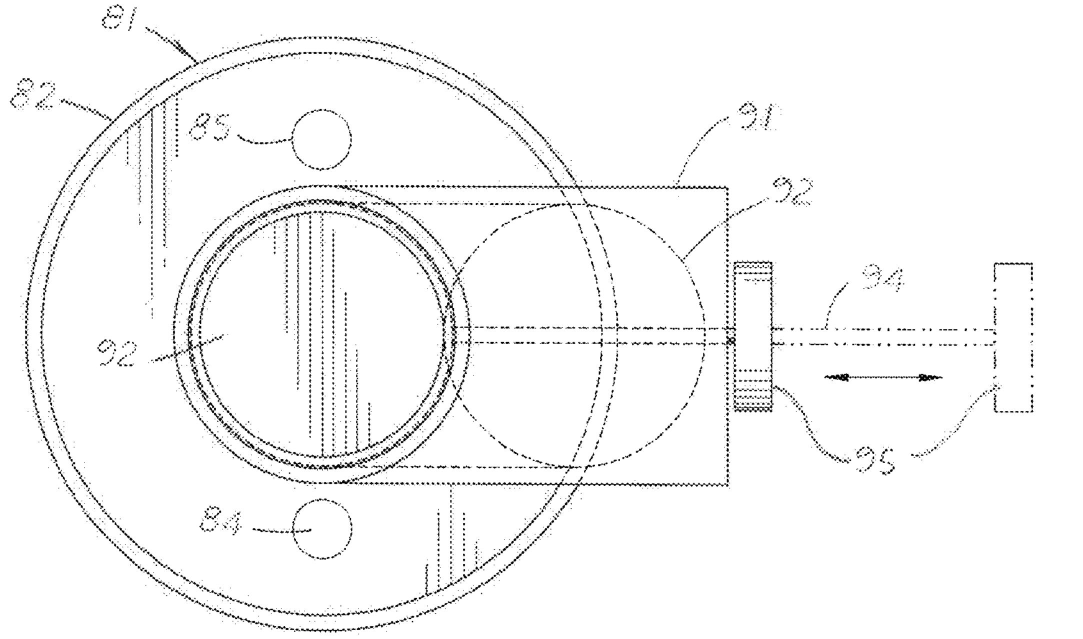
FIG. 18 is a top plan view of the sensor body shown in FIG. 17.

FIGS. 17 and 18 show a fourth embodiment of the sensor cap 80 with a slide gate 92 formed on the upward extending neck 88. The slide gate 92 slides laterally over the neck's center bore 90. The sensor cap 80 includes two electrode bores 84, 86, formed on the cylindrical cap body 81. Each bore 84, 86 receives an electrode 20. The cap body 81 includes external threads 82 that connect to internal threads 3 on the cleanout port 2 shown in FIG. 1. Formed under the cap body 81 is a recessed void area 83.

Extending upward from the cap body 81 is a neck 88 with a center bore 90 that communicates with the void area 83. Formed on the upper end of the neck 88 are optional external threads 89. Formed on the lower section of the neck 88 is a cylindrical nut-shaped body 87.

Extending laterally from the neck 88 is a side extension 91. Formed inside the side extension 91 is a plunger channel 92 that extends from the end of the side extension 91 into the center bore 90. Located inside the center bore 90 is a slide gate 93. Attached to the slide gate 93 is a plunger arm 94 that slides longitudinally in the plunger channel 92. A handle 95 is attached to the distal end of the plunger 94. During use, the user uses handle 95 to push and pull the plunger arm 94, which moves the slide gate 93 over the center bore 90 to close or open the center bore 90.

With each embodiment of the sensor cap, two electrodes 20 are inserted into the electrode bores. The sensor cap is then inserted into the cleanout port 2. The sensor cap is then rotated and tightened to create a watertight connection with the cleanout port 2. Wires 76, 77 from the signaling device 70 are then attached to the two electrodes 20. When sewer 7 fills the cleanout port 2 and the void space in the sensor cap, a ground fault condition occurs caused by sewer 7 contacting the tips of the electrodes 20. The signaling device 70 then produces a wireless alarm signal 100 or an audible alarm. A compatible wireless receiving device 98 receives the wireless alarm 100 signal and warns the user.

In the embodiments shown in the Figs. the cleanout port 2 is depicted as a t-shaped structure approximately 3 to 6 inches in diameter that fits in line with the main sewer line. It should be understood the sensor caps may be used with other types and sizes of cleanout ports 2. Also, the sensor caps shown are cylindrical structures with external threads that attach to internal threads 3 commonly used in a cleanout port 2. It should be understood the sensor caps could be modified to include internal threads that attach to cleanout ports with external threads. Also, the diameters of the sensor caps are 3 to 8 inches in diameter, and the diameters of the necks are 1 to 6 inches in diameter. necks can vary.

As discussed previously, the homeowner or plumbing professional, when confronted with the sewer backing up into the house, cannot determine if the clog is located upstream or downstream from the cleanout port 2. If sewer 7 backs up into the house, and a wireless signal 100 is not transmitted, it indicates that the clog is upstream from the cleanout port. 2. If sewer 7 backs up into the house and a wireless signal 100 is transmitted, it indicates the clog is downstream from the cleanout port 2. If the sensor cap includes a threaded neck and valve, the user may attach a hose or pipe to the end of the neck and open the valve to remove sewer 7 from the cleanout port 2.

In compliance with the statute, the invention described has been described as more or less specific to structural features. It should be understood, however, that the invention is not limited to the specific features shown since the means and construction shown comprise the preferred embodiments for putting the invention into effect. The invention is therefore claimed in its forms or modifications within the legitimate and valid scope of the amended claims, appropriately interpreted under the doctrine of equivalents.

I claim:

1. A wastewater sensor cap configured to attach to a cleanout port attached between two sewer lines, said sensor cap comprising:

a, a cylindrical cap body with a top surface, pendent sidewalls surrounding a void space formed under the top surface, and external threads formed on said sidewalls;

b. an upward extending neck formed on said top surface of said cap body; and c. two electrodes attached to said cap body and extending from said top surface of said cap body and into said void space.

2. The wastewater sensor cap, as recited in claim 1, wherein said neck has a nut-shaped body and closed at one end.

3. The wastewater sensor cap, as recited in claim 1, wherein said neck includes a center bore that communicates with said void space, said center bore includes a top opening enabling sewer located in said void space to escape through said neck, said neck includes external threads.

4. The wastewater sensor cap, as recited in claim 3, further including a secondary cap attached to said threaded neck.

5. The wastewater sensor cap, as recited in claim 3, further including a nut-shaped body formed on said neck.

6. The wastewater sensor cap, as recited in claim 5, further including a valve formed in said neck.

7. The wastewater sensor cap, as recited in claim 6, wherein said valve is a ball valve.

8. The wastewater sensor cap, as recited in claim 6, wherein said valve is a slide gate valve.

9. The wastewater sensor cap, as recited in claim 6, further including a secondary cap attached to said threaded neck.

10. The wastewater sensor cap, as recited in claim 3, further including a valve formed in said neck.

11. The wastewater sensor cap, as recited in claim 10, wherein said valve is a ball valve.

12. The wastewater sensor cap, as recited in claim 10, wherein said valve is a slide gate valve.

13. A wastewater sensor cap system, comprising:

a. a cylindrical cap body configured to attach to the cleanout port attached to a sewer line, said cap body includes a top surface, pendent sidewalls surrounding an void space under said top surface, and external threads formed on said sidewalls;

b. an upward extending neck formed on said top surface of said cap body;

c. at least two electrodes attached to said cap body and extending from said top surface of said cap body and into said void space, and;

d. an electronic signal device with two wires, each said wire connecting to one of said electrodes, said electronic signal device configured to detect a ground fault between said electrodes and configured to generate an alarm signal.

14. The wastewater sensor cap system, as recited in claim 13, wherein said electronic signal device includes a wireless communication transmitter configured to generate a wireless communication alarm signal.

15. The wastewater sensor cap system, as recited in claim 14, wherein said wireless communication alarm signal is a frequency band of either 2.4 GHz or 5 GHz.

16. The wastewater sensor cap system, as recited in claim 14, where said wireless communication alarm signal is a Bluetooth radio frequency signal.

17. The wasterwater sensor cap system, as recited in claim 13, further including a wireless device configured to receive said alarm signal from said wireless communication transmitter and inform a user of said wireless device that said alarm signal from said sensor cap has been received.

18. A method for detecting wastewater in a sewer cleanout, comprising:

a. providing a wastewater sensor cap attached to a cleanout port of a sewer line, the wastewater sensor cap including a cap body defining a void space beneath a top surface of the cap body;

b. positioning at least two electrodes so that the electrodes extend into the void space beneath the top surface of the cap body;

c. permitting wastewater entering the cleanout port to enter the void space and contact the at least two electrodes;

d. detecting, with an electronic signal device electrically connected to the at least two electrodes, an electrical condition between the at least two electrodes indicative of the presence of wastewater; and e. generating an alarm signal in response to detecting the electrical condition.

19. The method of claim 18, wherein an alarm comprises transmitting a wireless alarm signal to a remote electronic device.

20. The method of claim 18, wherein an electrical connection is a ground fault created when wastewater electrically connects the electrodes.

21. The method of claim 18, wherein the wastewater contacts the electrodes after entering the void space beneath the top surface of the cap body.

22. The method of claim 18, wherein the electrodes remain exposed within the void space during normal operation of the sewer cleanout.

* * * * *